Aug. 10, 1948.　　F. W. THOMPSON　　2,446,666
ELECTRIC COOKING HEATER
Filed Aug. 7, 1946　　　　　　　　　　2 Sheets-Sheet 1
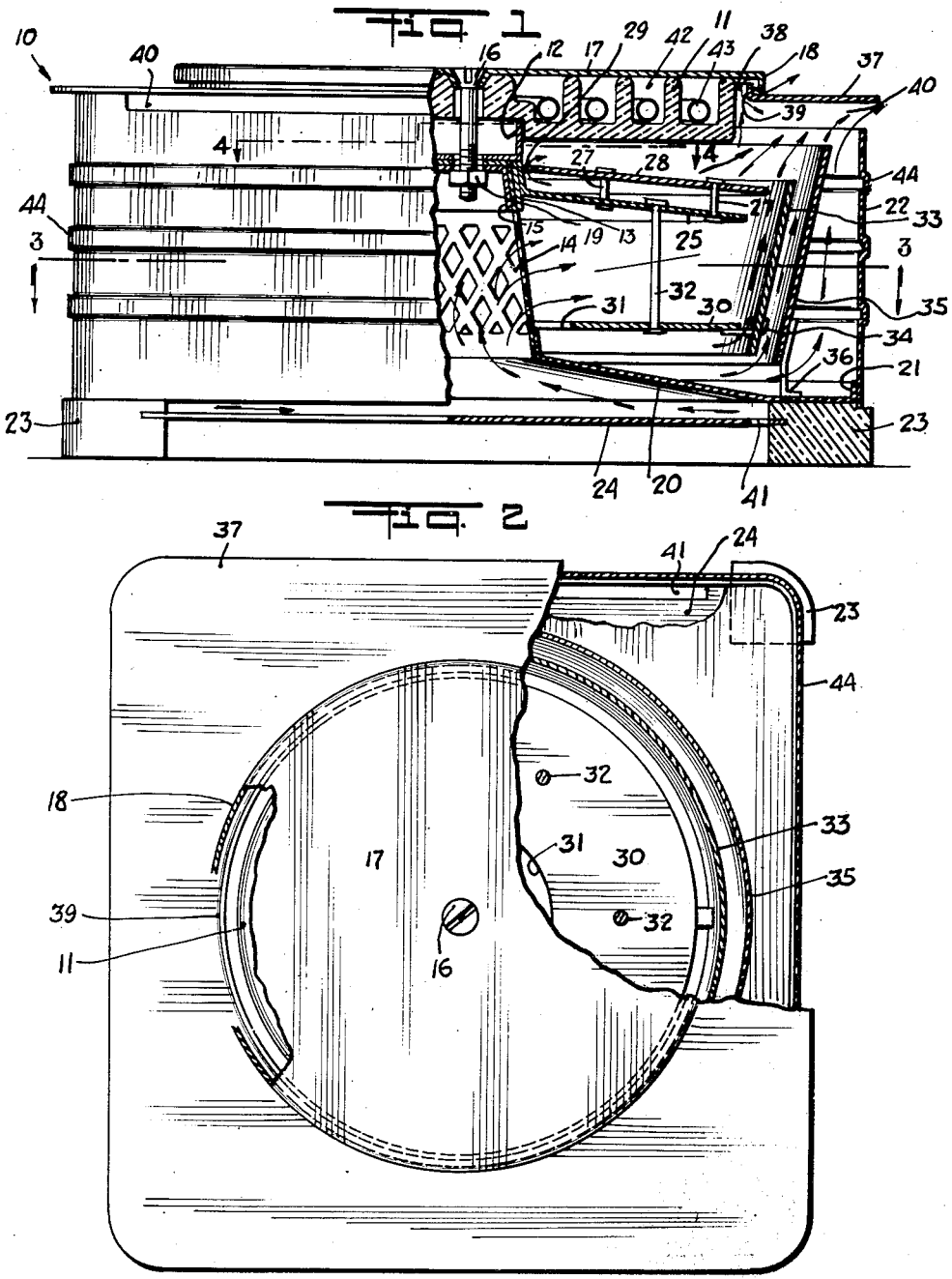
INVENTOR.
Frank W. Thompson
BY
Irving Seidman
ATTORNEY

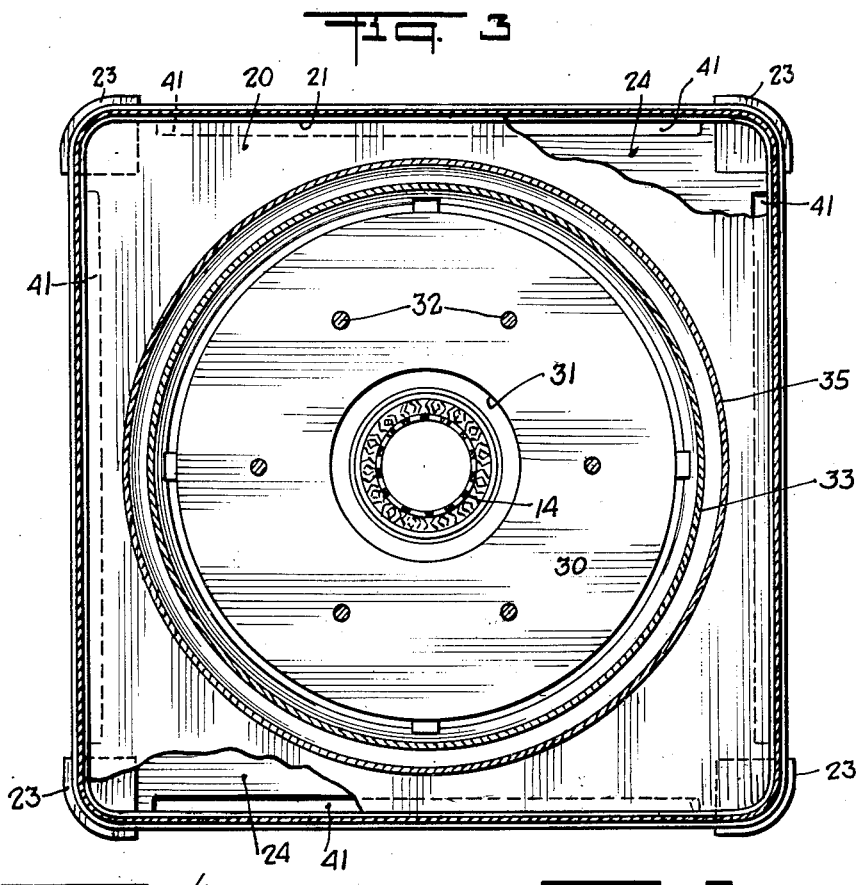
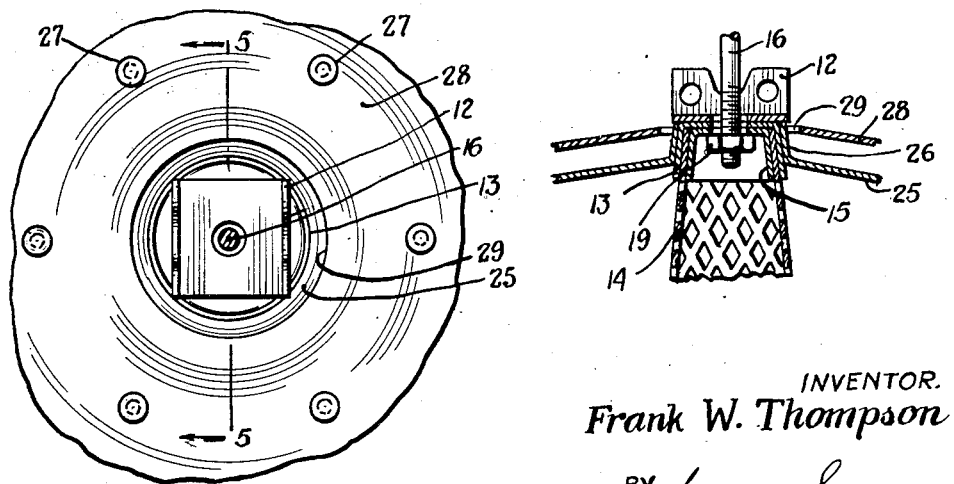

Patented Aug. 10, 1948

2,446,666

UNITED STATES PATENT OFFICE 2,446,666

ELECTRIC COOKING HEATER

Frank W. Thompson, New Haven, Conn., assignor to Ernest Gregory, Hamden, Conn.

Application August 7, 1946, Serial No. 688,854

3 Claims. (Cl. 219—37)

1

This invention relates to electric cooking heaters.

Broadly, it is an object of my invention to provide a cooking heater which will reflect the heat upward and provide a draft to keep the lower part of the heater cool.

More particularly, it is an object of my invention to limit the radiation outward to provide additional reflected heat.

A further object is to provide a heater which can be placed upon almost any surface and the surface will remain cool during the operation of the heater.

A further object is to provide a top plate with an overlapping flange which is not in contact with the top plate so that an air space is provided to aid in creating a top draft to vent the heat towards the center of heater.

Still a further object is to provide a central perforated supporting member for maximum ventilation.

Another object is to provide a heater with legs and a double bottom to permit a draft of air to be vented from beneath the heater and to maintain the lower part of the heater cool during operation.

Another object is to provide a heater which can be easily assembled and disassembled.

For a fuller understanding of the nature and objects of my invention reference is had to the following detailed description, in connection with the accompanying drawings, in which:

Figure 1 is a side elevation partly broken away to show the inner structure.

Figure 2 is a top view partly broken away.

Figure 3 is a sectional view taken through line 3—3 of Figure 1.

Figure 4 is a sectional view taken through line 4—4 of Figure 1.

Figure 5 is a sectional view of the upper part of the central supporting member taken through line 5—5 of Figure 4.

Referring to the drawings, numeral 10 represents an electric cooking heater having a refractory member 11 which rests upon a "U-shaped" plate 12. Plate 12 rests upon an inverted circular member 13 which rests upon the top of a perforated frusto-conical shaped member 14. A smaller circular member 15 is forced into the upper part of conical member 14 wedging the top of member 14 between the dish shaped sides of members 13 and 15. A circular metal plate 17, having a tapered central opening and portion overhanging the refractory member 11 with a depending flange 18 rests upon member 11.

2

Members 11, 12, 13, 15 and 17 have aligned holes in the centers permitting a central screw 16 to pass therethrough. By tightening nut 19 the entire heater is assembled.

The central conical member 14 is attached by welding, soldering or rivets to a sloping bottom member 20, the outer upturned flange 21 of which is also attached to the outer housing 22 of the heater 10 by welding, soldering or rivets. Housing 22 is substantially square but may be round, rectangular or of other geometric shape. Horizontal ribs 44 are pressed into the metal to both strengthen it and to enhance its appearance. Bottom member 20 and housing 22 rest upon short legs 23, preferably made of refractory material. Slits in legs 23 permit a sheet of metal 24 to rest spaced apart from bottom member 20. Since sheet 24 is supported only at the corners the space between it and bottom member 20 permits cool air to be drawn inward towards the central member 14 and upward through the perforations of member 14. To provide more space for air to be vented upward, metal sheet 24 is cut out along each side at 41 as shown in Figure 3. Sheet 24 also reflects upward any heat that may travel downward thus keeping the surface upon which the heater is placed cool.

A circular dished plate 25 having an upturned angular flange 26 with a central opening is seated upon the tapered circular member 13 and rests at the top of the central member 14. Attached to plate 25 and spaced apart therefrom by spacing member 27 is an upper dished plate 28, the top of which is polished or plated to reflect the heat upward. Plate 28 has a central opening 29 larger in diameter than flange 26 so that air passing between plates 25 and 28 can vent upward and pass between plate 28 and the lower surface of refractory member 11. A flat circular disk 30 having a large central opening 31 is attached to and below plate 25 by spacing posts 32. Opening 31 is spaced apart from central member 14 permitting air to vent upward through this opening. An angular circular flange 33, open at the top and bottom and spaced from the ends of plates 25 and 28 is hung upon brackets 34 to direct and vent the air upward. Another larger angular open circular flange 35, parallel to flange 33 and spaced apart from it, is attached by legs 36 above bottom member 20 and also vents the air upward between flange 33 and flange 35 and between flange 35 and housing 22.

A metal top plate 37 is attached to housing 22 by brackets and has a large circular central opening 38 somewhat larger in diameter than the refractory member 11 so that a space is left between member 11 and an upturned flange 39. Flange 18 of the plate 17 overhangs flange 39 and is spaced apart from flange 39 to permit air to vent upward and between flanges 39 and 18. Plate 37 overhangs the housing 22. Elongated openings 40 are placed at the top of the housing 22 below plate 37 around all sides to permit the vented air passing upward within the heater to escape.

Refractory member 11 may be of any well-known design and has channels 42 within which heating elements 43 in the form of resistance wire is placed. Heating elements 43 are connected to wires which lead to a terminal block having terminal posts which are connected to wires leading to a source of current supply.

The arrows shown in Figure 1 indicate the reflected heat and the direction of the flow of heat and air throughout the heater.

It is obvious that various changes and modifications may be made in the details of construction, appearance and arrangement of parts without departing from the general spirit of the invention.

I claim:

1. An electric cooking heater of the character described comprising a refractory channeled member, heating elements within the channels of said refractory member, a central supporting bracket for said refractory member connected to a source of current supply, a perforated frusto-conical central supporting member attached to said bracket, a bottom member attached to said central supporting member, said bottom member attached to a housing for said heater, a central top plate having a depending flange overlapping and covering said refractory member, a top plate having an upturned flange fitting beneath the depending flange of said central top plate and spaced apart from said flange and top plate to permit air to pass therebetween, openings between said top plate and said housing to vent air from within said heater to escape therethrough, legs to support and raise said heater to permit air to enter said heater, an auxiliary bottom plate supported by said legs to permit air to vent into said heater, a lower dished plate supported upon said central supporting member, an upper dished plate attached to and supported above and upon said lower dished plate, a flat disk attached to and supported below said lower dished plate, a central opening in said disk providing a space between said disk and said central supporting member, an angular flange spaced apart from said plates and open at the top and bottom supported upon said disk, a larger open angular flange spaced apart from said first named flange and supported upon said bottom member, whereby cool air is vented into said heater from below and through said heater escaping above.

2. An electric cooking heater of the character described comprising a refractory channeled member, heating elements within the channels of said refractory member, a central supporting bracket for said refractory member connected to a source of current supply, a perforated frusto-conical central supporting member attached to said bracket, a bottom member attached to said central supporting member, said bottom member attached to a housing for said heater, a central top plate having a depending flange overlapping and covering said refractory member, a top plate having an upturned flange fitting beneath the depending flange of said central top plate and spaced apart from said flange and top plate to permit air to pass therebetween, openings between said top plate and said housing to vent air from within said heater to escape therethrough, legs to support and raise said heater to permit air to enter said heater, an auxiliary bottom plate supported by said legs to permit air to vent into said heater, a bolt holding said central top plate, said refractory member, said supporting bracket and said central supporting member together, whereby an upward draft is created keeping the lower part of said heater cool.

3. An electric cooking heater of the character described comprising a refractory channeled member, heating elements within the channels of said refractory member, a central supporting bracket for said refractory member connected to a source of current supply, a perforated frusto-conical central supporting member attached to said bracket, a bottom member attached to said central supporting member, said bottom member attached to a housing for said heater, a central top plate having a depending flange overlapping and covering said refractory member, a top plate having an upturned flange fitting beneath the depending flange of said central top plate and spaced apart from said flange and top plate to permit air to pass therebetween, openings between said top plate and said housing to vent air from within said heater to escape therethrough, legs to support and raise said heater to permit air to enter said heater, an auxiliary bottom plate supported by said legs to permit air to vent into said heater, a bolt holding said central top plate, said refractory member, said supporting bracket and said central supporting member together, an inverted circular member fitted upon the top of said central supporting member, a smaller inverted circular member fitted within the top of said central supporting member wedging said top between said circular members, whereby an upward draft is created keeping the lower part of said heater cool.

FRANK W. THOMPSON.

REFERENCES CITED

The following references are of record in the file of this patent:

UNITED STATES PATENTS

| Number | Name | Date |
|---|---|---|
| 1,107,333 | Mansfield et al. | Aug. 18, 1914 |
| 1,502,315 | Moller | July 22, 1924 |
| 1,533,175 | Fahrenwald | Apr. 14, 1925 |
| 1,855,507 | Bathrick | Apr. 26, 1932 |
| 2,111,849 | Fischer | Mar. 22, 1938 |
| 2,239,957 | Genda | Apr. 29, 1941 |